(12) United States Patent
Guo et al.

(10) Patent No.: US 10,136,449 B2
(45) Date of Patent: Nov. 20, 2018

(54) WIRELESS LOCAL AREA NETWORK WITH ZERO-WAIT DYNAMIC FREQUENCY SELECTION

(71) Applicant: Avago Technologies International Sales Pte. Limited, Singapore (SG)

(72) Inventors: Yongfang Guo, Saratoga, CA (US); Ling Su, Los Altos Hills, CA (US); Rohit V. Gaikwad, San Diego, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 41 days.

(21) Appl. No.: 15/216,276

(22) Filed: Jul. 21, 2016

(65) Prior Publication Data

US 2017/0026988 A1    Jan. 26, 2017

Related U.S. Application Data

(60) Provisional application No. 62/195,231, filed on Jul. 21, 2015.

(51) Int. Cl.
| | |
|---|---|
| H04W 72/04 | (2009.01) |
| H04L 12/24 | (2006.01) |
| H04W 72/12 | (2009.01) |
| H04W 28/20 | (2009.01) |
| H04W 84/12 | (2009.01) |

(52) U.S. Cl.
CPC ....... *H04W 72/1242* (2013.01); *H04W 28/20* (2013.01); *H04W 84/12* (2013.01)

(58) Field of Classification Search
CPC .. H04W 28/20; H04W 84/12; H04W 72/1242
See application file for complete search history.

(56) References Cited

U.S. PATENT DOCUMENTS

| | | | |
|---|---|---|---|
| 9,635,649 B1* | 4/2017 | Amiri | H04W 72/0406 |
| 2006/0171305 A1* | 8/2006 | Stefani | H04W 72/042 370/228 |
| 2016/0345323 A1* | 11/2016 | Krishnamoorthy | H04W 48/02 |
| 2017/0188293 A1* | 6/2017 | Mizusawa | H04W 48/16 |

* cited by examiner

*Primary Examiner* — Andrew W Chriss
*Assistant Examiner* — Lalita W Pace
(74) *Attorney, Agent, or Firm* — Sterne, Kessler, Goldstein & Fox P.L.L.C.

(57) ABSTRACT

The present disclosure is directed to systems, apparatuses, and methods for operating a wireless local area network (WLAN) modem to perform WLAN channel change in a WLAN environment that is inhabited by radar devices, and therefore subject to a Dynamic Frequency Selection (DFS) requirement defined by the appropriate WLAN governing standards. Specifically, the present disclosure is directed to an apparatus and method for reducing or eliminating the amount of time in which a WLAN transceiver cannot transmit/receive data traffic while listening for radar signals on a channel allocated to radar devices for the minimum listening time specified by DFS.

20 Claims, 4 Drawing Sheets

WIRELESS LOCAL AREA NETWORK WITH ZERO-WAIT DYNAMIC FREQUENCY SELECTION

CROSS REFERENCE TO RELATED APPLICATIONS

This application claims the benefit of U.S. Provisional Application No. 62/195,231, filed Jul. 21, 2015, which is incorporated herein by reference in its entirety.

TECHNICAL FIELD

This application relates generally to dynamic frequency selection (DFS), including DFS for wireless local area network (WLAN) devices.

BACKGROUND

Electronic devices, such as personal computers, laptops, tablets, and smartphones, often implement wireless local area network (WLAN) technology to wirelessly communicate data using a corresponding WLAN(s). "WLAN" can also be referred to as "WiFi." WLAN technology is any WLAN product based on one of the Institute of Electrical and Electronics Engineers' (IEEE) 802.11 standards, which operate in the 900 MHz and 2.4, 3.6, 5, and 60 GHz frequency bands. Currently, the 2.4 GHz band is the most commonly used band by WLAN modems. As a result, the 2.4 GHz band is also typically the most congested band.

The 5 GHz band can offer less congestion, but comes with its own set of issues. In particular, portions of the 5 GHz band have been allocated to radar devices in most countries. These radar devices, such as military and weather radar, have priority over WLAN modems. Therefore, in order to use the portions of the 5 GHz band that are allocated to radar devices, WLAN modems are required to comply with Dynamic Frequency Selection (DFS), which is outlined in the 802.11 standards.

Under DFS, a WLAN modem is to listen for some minimum listening time, such as 60 seconds, for signals from a radar source on a channel allocated to radar devices before transmitting over the channel. If radar signals are detected within the minimum listening time, the WLAN modem is to vacate the channel and select a different channel to transmit over. If no radar signals are detected within the minimum listening time, the WLAN modem can begin to transmit over the channel. Although DFS allows these channels allocated to radar devices to be used by WLAN modems when available, one of the main drawbacks of DFS is that that the WLAN modem has to stop transmitting/receiving data traffic for the minimum listening time.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. The drawing in which an element first appears is typically indicated by the leftmost digit(s) in the corresponding reference number.

DETAILED DESCRIPTION

Figure 1:
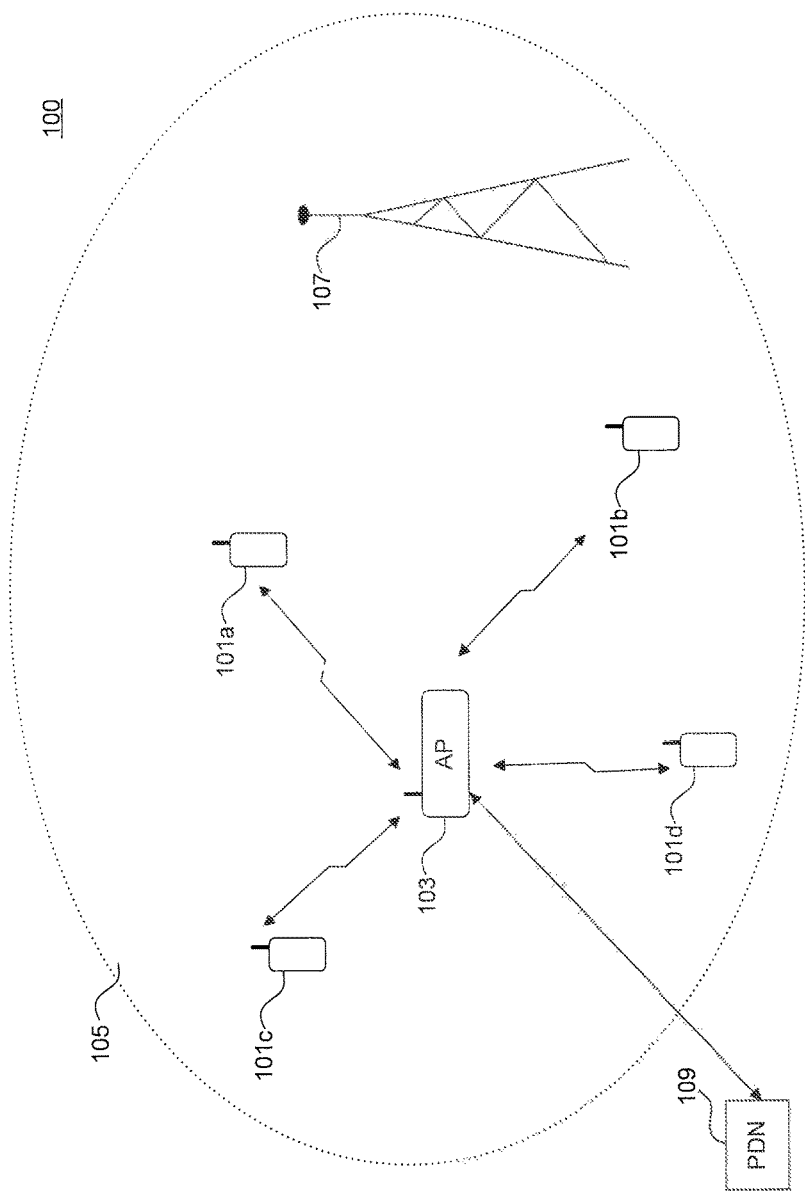
FIG. 1 illustrates a WLAN environment according to embodiments of the disclosure.

In the following description, numerous specific details are set forth in order to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It will be apparent to persons skilled in the relevant art(s) that various elements and features of the present disclosure, as described herein, can be implemented in hardware using analog and/or digital circuits, or through the execution of computer instructions by one or more general purpose or special-purpose processors, or as a combination of the aforementioned.

1. Overview

The present disclosure is directed to an apparatus and method for reducing or eliminating the amount of time in which a WLAN modem cannot transmit/receive data traffic while listening for radar signals on a channel allocated to radar devices for the minimum listening time specified by DFS. These and other embodiments of the present disclosure are described further below.

2. Detailed Discussion

Terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms may be utilized interchangeably in the subject specification and related drawings. Likewise, the terms "access point," "base station," "base transceiver station", "Node B." "evolved Node B (eNode B)," home Node B (HNB)," "home access point (HAP)," or the like, may be utilized interchangeably in the subject specification and drawings, and refer to a wireless network component or apparatus that serves and receives data, control, voice, video, sound, gaming, or substantially any data-stream or signaling-stream from a set of subscriber stations.

For the purposes of this discussion, the term "processor circuitry" shall be understood to be one or more: circuit(s), processor(s), or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to embodiments described herein. Alternatively, the processor can access an internal and/or external memory to retrieve instructions stored in the memory, which when executed by the processor, perform the corresponding function(s) associated with the processor.

FIG. 1 illustrates a WLAN environment 100, according to an embodiment of the present disclosure. WLAN environment 100 illustrates WLAN subscriber devices 101a-101d that wirelessly communicate with a WLAN access point 103 that is associated with a wireless LAN, and that can be connected to a Public Data Network (PDN) 109 using a wired or wireless connection, thereby providing access to the PDN 109 via the wireless LAN. WLAN subscriber devices 101 can be, but are not limited to, a mobile phone, smartphone, personal digital assistant (PDA), laptop, desktop, tablet, gaming console or controller, home appliance, or other computer/communication/display device that will apparent to those skilled in the art.

WLAN subscriber devices 101 and WLAN access point 103 operate based on one or more of the Institute of Electrical and Electronics Engineers' (IEEE) 802.11 standards. The IEEE 802.11 standards communicate in the 900 MHz and 2.4 GHz, 3.6 GHz, 5 GHz, and 60 GHz frequency bands. Currently, the 2.4 GHz band is the most commonly used band by WLAN modems. As a result, the 2.4 GHz band is also typically the most congested band.

The WLAN environment 100 further includes radar equipment 107, which can include for example, a weather radar or military radar, or some other radar that has frequency band priority over WLAN devices. For example, the radar equipment 107 can occupy and utilize the same 5 GHz frequency band utilized by the WLAN devices 101 and WLAN access point 103. When the coverage area 105 of the access point 103 or WLAN subscriber devices 101 include the radar device 107, then detrimental electronic interference can occur to the radar equipment 107 when the WLAN devices are transmitting. Therefore, in order to use the portions of the 5 GHz band that are allocated to radar equipment, WLAN modems are required to comply with Dynamic Frequency Selection (DFS), which is outlined in the 802.11 standards.

Under DFS, a WLAN modem is required to listen for some minimum listening time, such as 60 seconds, for signals from a radar source on a channel allocated to radar devices before transmitting over the channel. This scanning procedure is referred to as the "DFS channel scan." If radar signals are detected within the minimum listening time, the WLAN modem is to vacate the channel and select a different channel to communicate over. If no radar signals are detected within the minimum listening time, the WLAN modem can begin to transmit over the channel. Although DFS allows these channels allocated to radar devices to be used by WLAN modems when available, one of the main drawbacks of DFS is that the WLAN modem has to stop transmitting/receiving data traffic for the minimum listening time. Table 1 below provides example WLAN channels in the 5 GHz WLAN band that are subject to the DFS scan requirement, and hence referred to as "DFS channels." Accordingly, when changing channels from CH 36 (a non-DFS channel) to channel 52 (a DFS channel), then the DFS scanning procedure must be performed. Further, even when a WLAN subscriber is already operating on a first DFS channel (e.g. CH 52), scanning must be performed before switching to a second DFS channel (e.g. CH 60).

TABLE 1

| DFS Channels/Frequencies | |
|---|---|
| CH # | Frequency |
| 52 | 5260 MHz |
| 56 | 5280 MHz |
| 60 | 5300 MHz |
| 64 | 5320 MHz |
| 100 | 5500 MHz |
| 104 | 5520 MHz |
| 108 | 5540 MHz |
| 112 | 5560 MHz |
| 116 | 5580 MHz |
| 120 | 5600 MHz |
| 124 | 5620 MHz |
| 128 | 5640 MHz |
| 132 | 5660 MHz |
| 136 | 5680 MHz |
| 140 | 5700 MHz |

Figure 2:
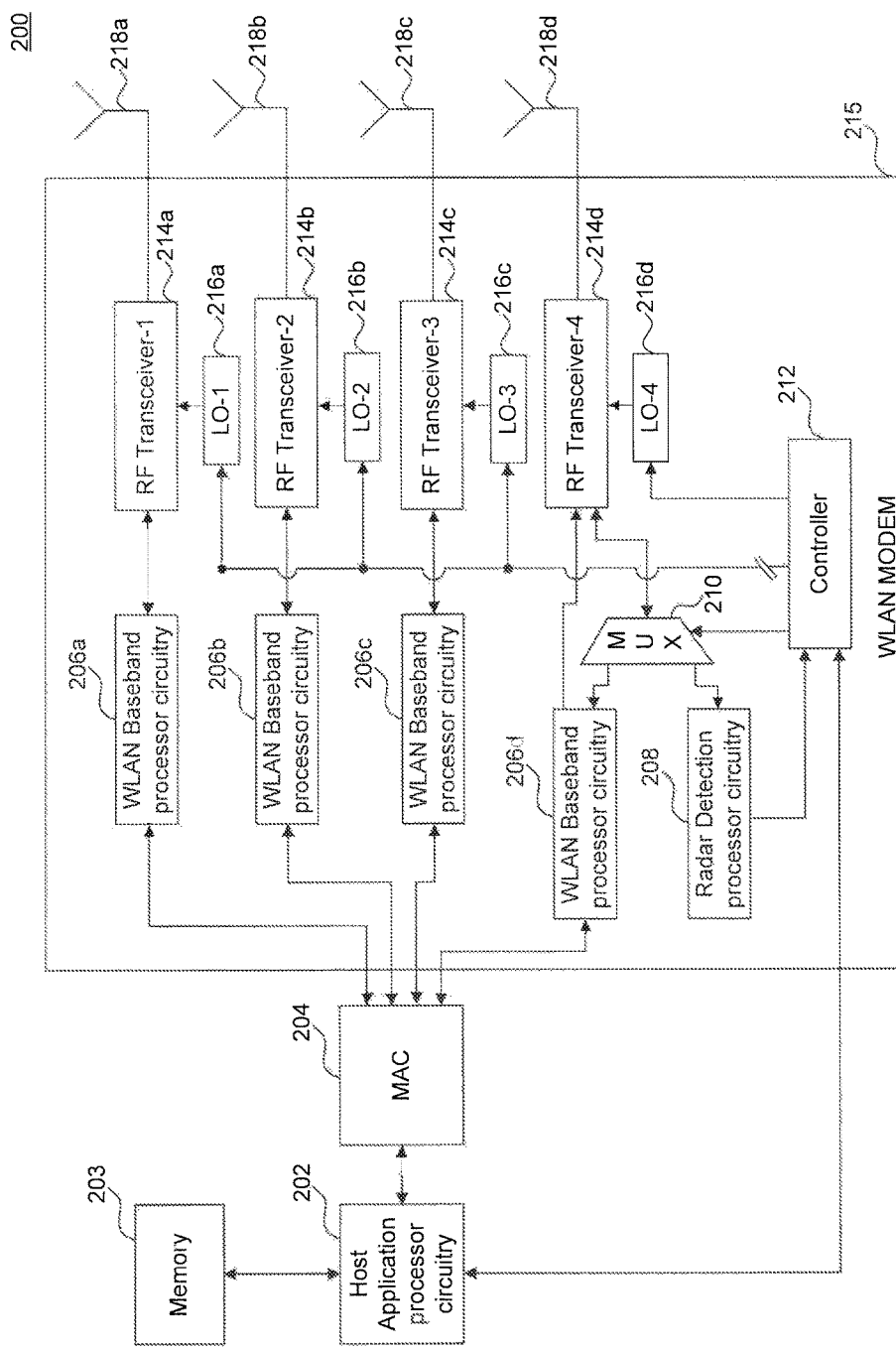
FIG. 2 illustrates a WLAN subscriber device in accordance with embodiments of the present disclosure.

FIG. 2 illustrates a WLAN subscriber device 200 and can represent an example of WLAN subscribers 101 shown in FIG. 1, according to an embodiment of the disclosure. WLAN subscriber device 200 includes a host application processor circuitry 202 (i.e. "host"), memory 203, media access control (MAC) 204, WLAN modem 215, and antennas 218a-d. As will be shown, the WLAN modem 215 can operate in the 5 GHz WLAN band and adhere to the DFS scanning requirement, without disrupting current WLAN communications during the DFS scanning procedure.

Host 202 implements overall control of WLAN subscriber device 200, including power control, user interface control, WLAN modem control, as well as running various applications (e.g. user applications) that can be stored in memory 203. An example user application is an Internet browser that can use the MAC 204 and WLAN modem 215 for wireless communications of data. MAC 204 provides media arbitration to the WLAN environment, including IEEE layer-2 functionality such as packet framing/de-framing, packet routing and addressing, access point arbitration, and other processing according to the governing WLAN protocol, as will be understood by those skilled in the arts based on the discussion given herein.

WLAN modem 215 includes WLAN baseband processor circuitry (or "circuits") 206a-d, radio frequency (RF) transceivers 214a-d, local oscillators 216a-d, radar detection processor circuitry 208, de-multiplexer 210, and controller 212. WLAN modem 215 performs physical (PHY) layer signal processing including: digital-to-analog (D/A) conversion, analog-to-digital (D/A) conversion, modulation/demodulation, error detection/correction, frequency conversion, amplification and filtering of analog signals during wireless communications. As will be illustrated, WLAN modem 215 is configured to perform the DFS scanning procedure prior to WLAN channel change to a DFS channel, without interrupting WLAN communications on the current WLAN channel. It is noted that WLAN modem 215 includes four WLAN baseband processor circuitry 206 and four RF transceivers 214. The number of WLAN baseband processor circuitry 206 and RF transceivers 214 is for illustration only, and can be any number greater than two and still be within the scope and spirit of the disclosure.

Each WLAN baseband processor circuitry 206 performs WLAN baseband processing including: signal modulation/demodulation, symbol mapping, precoding, error detection/correction, symbol mapping/de-mapping, interleaving/de-interleaving. When orthogonal frequency division multiplexing (OFDM) is used, then WLAN baseband processor circuitry 206 can include a Fast Fourier Transform (FFT) and inverse FFT to perform OFDM signal processing.

Figure 3:
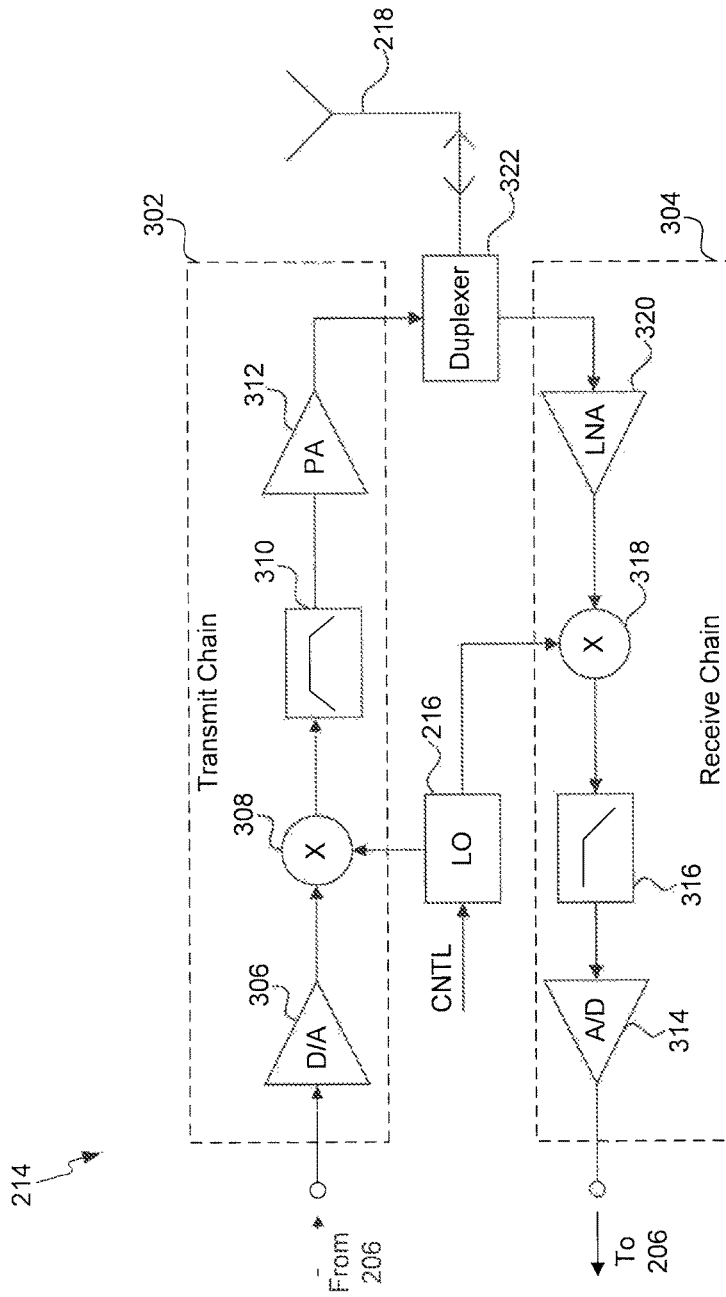
FIG. 3 illustrates a radio frequency (RF) transceiver utilized in the WLAN subscriber device in accordance with embodiments of the present disclosure.

Each RF transceiver 214 receives a LO signal from its corresponding LO 216 to enable transmission and reception of RF signals using the corresponding antenna 218, where the frequency of the LO signal controls the frequency of the RF signal that is transmitted during wireless communication. As shown in FIG. 3, each RF transceiver 214 includes a transmit chain 302 and a receive chain 304. The transmit chain 302 receives digital data from the corresponding WLAN baseband processor circuitry 206 and generates an RF signal for transmission by the corresponding antenna 218. The receive chain 302 receives an RF signal from the corresponding antenna 218 and generates digital data for processing by the WLAN baseband processor 206. Each LO 216 can be implemented using a phase lock loop (PLL), as will be understood by those skilled in the art.

Referring to FIG. 3, the receive chain 304 includes an A/D converter 314, a low pass filter 316, a mixer 318 coupled to the corresponding LO 216, and a low noise amplifier 320. During the receive operation, the LNA 320 receives an RF signal from the corresponding antenna 218 and performs amplification prior to frequency down-conversion. The mixer 318 performs frequency down-conversion by mixing the LO signal from the LO 216 with the RF signal output from the amplifier 320. The RF signal is operating on a particular frequency channel of the WLAN frequency band, for example CH 52, which is 5260 MHz per Table 1. Accordingly, assuming direct conversion, the LO 216, which is tunable, can be set to 5260 MHz to perform direct down-conversion of CH 52 to baseband, or an offset can be used if an intermediate frequency (IF) is desired. The baseband output signal is lowpass filtered prior to conversion from analog-to-digital by the A/D converter 314, which provides the corresponding digital data to the WLAN baseband processor circuitry 206 for further processing.

Still referring to FIG. 3, the transmit chain 302 includes a D/A converter 306, a mixer 308 coupled to the LO 216, a bandpass filter 310, and a power amplifier 312. During transmit, the D/A converter 306 receives digital data from the WLAN baseband processor circuitry 206 and converts the digital data to an analog signal. The mixer 308 then frequency up-converts the analog signal from baseband to an RF frequency (e.g., in the 5 GHz WLAN band) using the LO signal from the LO 216, where the exact RF channel of the up-conversion is determined by the frequency of the LO signal. For example, the LO 216, which is tunable, can be set to 5260 MHz to achieve RF transmission on WLAN channel 52, assuming the mixer is a direct conversion mixer. The bandpass filter 310 filters the RF signal at the output of the mixer 308 to remove extraneous frequencies prior to amplification by the power amplifier 312, the output of which is then transmitted by the antenna 218.

The RF transceiver 214 optionally includes a duplexer 322 to provide an interface between the transmit and receive chains 302, 304 and the antenna 218. Assuming frequency duplexing, the duplexer 322 can be a filter that separates the transmit and receive frequencies that can be sent/received using the antenna 218. Assuming time duplexing, the duplexer 322 is a switch that connects either the transmit chain 302 or the receive chain 304 to the antenna 218.

Referring back to FIG. 2, controller 212 includes one or more circuits (e.g. a digital state machine, or logic) or hardware processor(s) to provide overall control of the WLAN modem 215, including communicating with host 202, controlling the frequency of the LOs 216 for the individual RF transceivers 214, and controlling the de-multiplexer 210, as will be described herein. The controller 212 when implemented by a processor can be "hard-coded" with instructions to perform corresponding function(s) according to embodiments described herein. Alternatively, the processor can access an internal and/or external memory to retrieve instructions stored in the memory, which when executed by the processor, perform the corresponding function(s) associated with the controller.

The radar detector processor circuitry 208 receives digital data from RF transceiver 214d during a DFS scan and analyzes the digital data for the presence of any radar signals in the DFS channel that is being scanned. Radar signals inherently have a periodic "ON/OFF" pulse characteristic that is readily identifiable in the digital data received from the RF transceiver 214d. This occurs because the radar equipment must transmit a pulsed signal to identify or characterize a "target," and then wait for a return signal that is reflected from the target. The amplitude, phase, frequency, or time delay of the return signal can be used by the radar equipment to characterize the location, speed, or some other characteristic of the target. Accordingly, radar detector processor circuitry 208 can be configured to recognize the periodic "ON/OFF" characteristic in digital data that would indicate the presence of an active radar on the DFS channel during a DFS scan.

As indicated, host 202 can execute user applications, such as an Internet browser, that transmits and receives data using WLAN modem 215. Host 202 may determine that the response time for queries over the WLAN is taking too long (e.g. exceeds a time threshold), and therefore the host 202 can request, or command, a WLAN channel change in such a circumstance. In order to do so, the host 202 can send a command to controller 212 requesting a WLAN channel change. The host 202 may specify the desired WLAN channel in the change command, or enable the controller 212 to select the desired WLAN channel for the channel change. Further, if the desired WLAN channel is a DFS channel, then the host 202 can also command the controller 212 to perform a DFS scan prior to making the channel change, or provide an indication that the desired channel is a DFS channel. Alternatively, the controller 212 can recognize that a DFS scan is required based on the desired WLAN channel being a DFS channel, by referencing a table (such as Table 1) stored in a memory accessible to the controller 212.

Prior to the DFS channel scan, all four RF transceivers 214 are tuned to the same current WLAN channel for wireless data communication, which may or may not be also be a DFS channel. (If the current WLAN channel is a DFS channel, then it is was previously scanned and cleared of radar signals.) Accordingly, all four LOs 216 are tuned to the same WLAN frequency to perform wireless communications prior to any DFS channel scan. Further, the de-multiplexer 210 is set to send the digital data output of RF transceiver 214d to the WLAN baseband processor circuitry 206d prior to the DFS scan, to enable baseband processing of the digital data by the WLAN baseband processor circuitry 206d.

Upon receipt of the channel change command to a DFS channel (e.g. CH 52, 5360 GHz), the controller 212 initiates a DFS channel scan using the RF transceiver 214d and the LO 216d. Specifically, the controller tunes the LO 216d to the desired DFS channel, and switches the de-multiplexer 210 so the digital data output of the RF transceiver 214d is sent to the radar detection processor circuitry 208 for detection of any radar signals using the pulse signature described above. The DFS channel scan is performed for a predetermined period of time, e.g. 60 sec, after which the radar detection processor circuitry 208 indicates whether radar signals were detected on the desired DFS channel, via a status message sent to the controller 212. if no radar signals, are detected, then the controller 212 can notify the host 202 that the desired DFS channel is available for communications, and the remaining LOs 216 can be tuned to the desired DFS channel for WLAN communications. If radar signals are detected, then the controller 212 can notify the host 202 that another WLAN channel will have to be selected for the channel switch, and another DFS scan may be required for the new WLAN channel if it is a DFS channel. Alternatively, the controller can select new WLAN channel.

During the DFS scan of the desired (i.e. prospective) WLAN channel, the WLAN baseband processor circuitry 206d is unable to receive and process WLAN data because of the LO 216d frequency change and because the radar detection processor circuitry 208 is receiving the digital data output from the RF transceiver 214d. However, the remaining three RF transceivers 214a-c are still tuned to the current WLAN channel, and therefore continue to transmit and receive WLAN signals over the WLAN. Therefore, WLAN data communications continue throughout the DFS channel scan, although data throughput is somewhat curtailed due the loss of the RF transceiver 214d to perform the radar signal detection.

Figure 4:
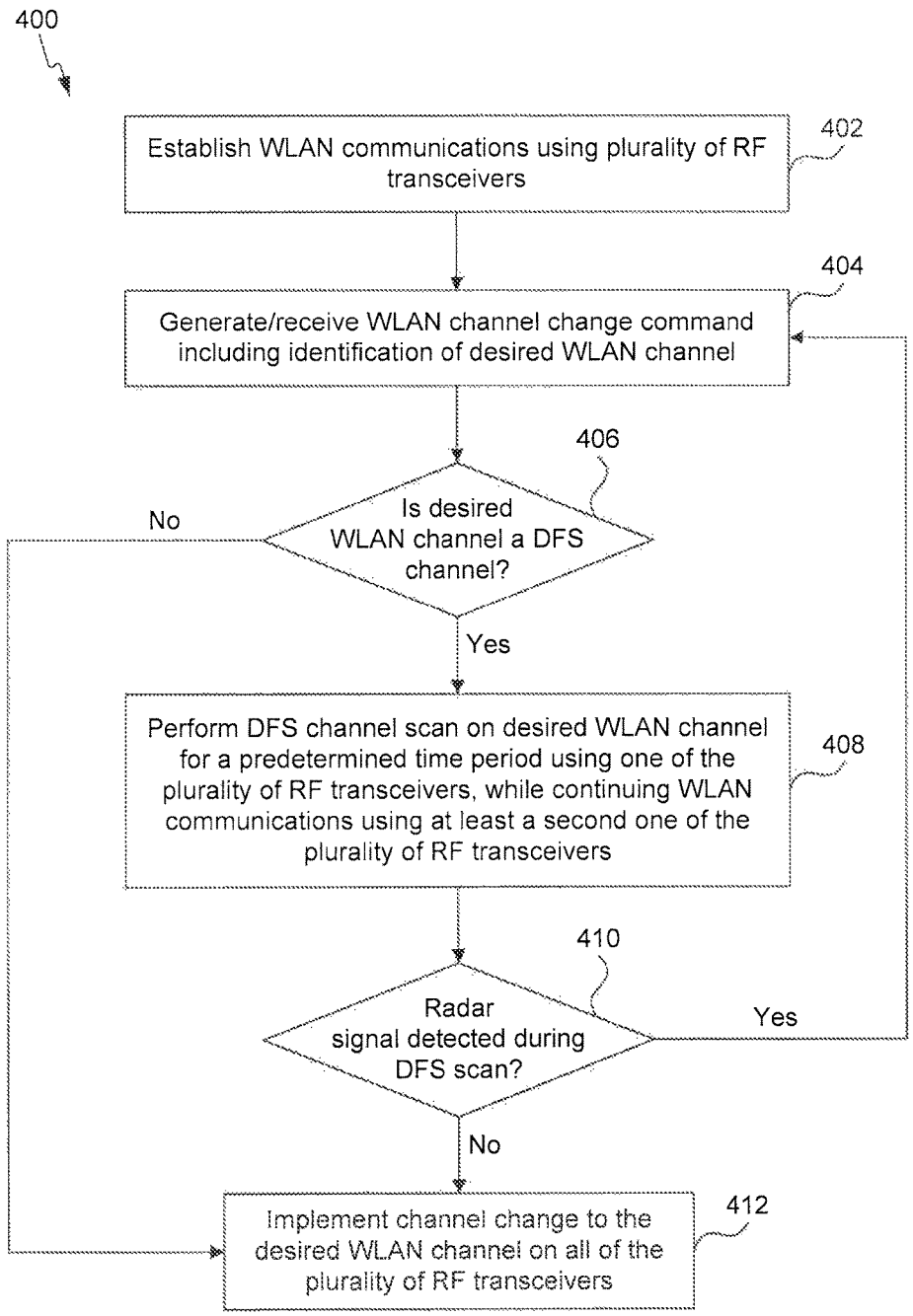
FIG. 4 illustrates a flowchart depicting WLAN channel change in accordance with embodiments of the present disclosure.

FIG. 4 illustrates a flowchart 400 that further describes performing a WLAN channel change and DFS channel scan according to embodiments of the present disclosure.

In step 402, WLAN communication is established, and are on-going, using a plurality of RF transceivers operating on a current WLAN channel. For example, WLAN modem 215 having RF transceivers 214a-d can provide WLAN communications for the host 202 that is executing one or more applications that utilize the WLAN for data communications.

In step 404, a WLAN channel change is indicated. For example, the host 202 can determine that the current WLAN channel is insufficient, e.g. the data throughput is too slow, and therefore sends a channel change command to the controller 212 of the WLAN modem 215. Further, the channel change command can specify the desired WLAN channel, or the controller 212 can be authorized to select it.

In step 406, a determination is made as to whether the desired (i.e., prospective) WLAN channel is a DFS channel, and therefore subject to the DFS channel scan procedure, prior to implementing a WLAN channel change. For example, either the host 202 or the controller 212 can make this determination by accessing a table, such as Table 1 above, stored in a memory. As indicted above, a DFS channel is a WLAN channel that is a priori known to occupy frequency(s) that can overlap and with radar signal frequency(s), where the radar signals have priority over WLAN communication per the WLAN 802.11 standards.

If the desired WLAN channel is not a DFS channel, then control flows to step 412. If the desired WLAN channel is a DFS channel then, at step 408, a DFS channel scan is performed for the desired WLAN channel. For example, one of the plurality of RF transceivers (e.g. RF transceiver 214d) is tuned to the desired WLAN channel for a predetermined period of time to listen for radar signals. This can be performed by tuning the corresponding LO 216 (e.g. 216d) to the desired WLAN channel assuming direct down-conversion, and controlling the de-multiplexer 210 so that the digital data output from the RF transceiver 214d is switched to the radar detection processor circuitry 208 for detection of radar signals. As indicated above, radar signals can be detected by the ON/OFF pulse characteristic that will appear in the digital data when radar signals are present on the desired WLAN channel. Importantly, during the DFS channel scan, the remaining RF transceivers (e.g. RF transceivers 214a-c) continue to communicate WLAN data on the current WLAN channel, so that WLAN service is not disrupted to the subscriber device.

After the pre-determined listening period, at step 410, a determination is made whether radar signals occupy the desired DFS channel. If radar signals are detected, then control returns to step 404, where another WLAN channel is selected for the channel change. If the no radar signals are detected, then in step 412, the channel change is implemented. For example, controller 212, upon notification that no radar signals were detected, can tune the remaining RF transceivers not involved in the DFS channel scan (e.g. RF transceivers 214a-c) to the desired WLAN channel, by adjusting the frequencies of the corresponding LOs 216, as discussed above. After which, WLAN data communications is carried out on the new WLAN channel.

3. Conclusion

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A method of operating a wireless local area network (WLAN) modem having a plurality of radio frequency (RF) transceivers, comprising:
communicating WLAN data using all of the plurality of RF transceivers tuned to a same first frequency; and
transitioning WLAN communication from the same first frequency to a second frequency, including
scanning for radar signals operating on the second frequency using a first RF transceiver of the plurality of RF transceivers for a predetermined time period; and simultaneously, with scanning for the radar signals on the second frequency using the first RF transceiver of the plurality of RF transceivers, continuing communicating WLAN data using a remainder of the plurality of RF transceivers utilizing a corresponding number of local oscillator (LO) signals all tuned to the same first frequency, wherein the remainder of the plurality of RF transceivers and the corresponding number of LO signals are greater than or equal to two.

2. The method of claim 1, wherein the second frequency is a dynamic frequency selection (DFS) frequency that is defined in a WLAN 802.11 standard.

3. The method of claim 1, wherein the transitioning WLAN communication includes:

determining if radar signals are present on the second frequency during the predetermined time period; and after the predetermined time period, communicating WLAN data using all the plurality of RF transceivers tuned to the second frequency if no radar signals are detected on the second frequency during the predetermined time period.

4. The method of claim 3, wherein the transitioning WLAN communication further includes:

after the predetermined time period, selecting a third frequency for prospective WLAN communication if radar signals are detected on the second frequency during the predetermined time period; and scanning for radar signals operating on the third frequency using the first RF transceiver of the plurality of RF transceivers for the predetermined time period.

5. The method of claim 3, wherein the determining if radar signals, are present on the second frequency includes:

analyzing digital data output from the first RF transceiver of the plurality of RF transceivers to search for a periodic ON/OFF pulse characteristic that signifies the presence of radar signals on the second frequency.

6. The method of claim 1, wherein the scanning for radar signals includes:

tuning a first LO signal of a plurality of LO signals to the second frequency, the first LO signal used for frequency down-conversion of a first RF signal that is received by the first RF transceiver of the plurality of RF transceivers.

7. The method of claim 6, wherein the scanning for radar signals further includes:

switching an output of the first RF transceiver of the plurality of RF transceivers from WLAN baseband processor circuitry to radar detection processor circuitry for radar signal detection.

8. A wireless local area network (WLAN) modem, comprising:

a plurality of radio frequency (RF) transceivers, each configured to receive a WLAN signal operating at an RF frequency determined by a local oscillator (LO) frequency of a corresponding LO signal;

a plurality of WLAN baseband processor circuits, each coupled to a corresponding RF transceiver and configured to perform baseband processing associated with the WLAN signal; and a controller configured to tune the RF frequency of a first RF transceiver of the plurality of RF transceivers from a first RF frequency to a second RF frequency to scan for radar signals operating on the second RF frequency;

wherein a remainder of the plurality of RF transceivers are tuned to the first RF frequency to communicate WLAN data simultaneously with the scan for radar signals operating on the second RF frequency, wherein the corresponding LO signal for each transceiver in the remainder of the plurality of RF transceivers is tuned to the first RF frequency to communicate the WLAN data simultaneously with the scan for radar signals operating on the second RF frequency, and wherein the remainder of the plurality of RF transceivers and a corresponding number of LU signals are greater than or equal to two.

9. The WLAN modem of claim 8, further comprising:

radar detection processor circuitry configured to detect radar signals in baseband digital data output from the first RF transceiver of the plurality of RF transceivers.

10. The WLAN modem of claim 9, wherein the radar detection processor circuitry is configured to analyze the baseband digital data to search for a periodic ON/OFF pulse characteristic that signifies the presence of radar signals on the second frequency.

11. The WLAN modem of claim 9, further comprising a de-multiplexer configured to switch the baseband digital data between an input of a first WLAN baseband processor circuit corresponding to the first RF transceiver and an input of the radar detection processor circuitry based on a command from the controller.

12. The WLAN modem of claim 8, wherein the controller is further configured to tune the RF frequency of each of the remainder of the plurality of RF transceivers from the first RF frequency to the second RF frequency if no radar signals are detected operating on the second RF frequency for a predetermined period of time.

13. The WLAN modem of claim 12, wherein the controller is further configured to tune the RF frequency of the first RF transceiver of the plurality of RF transceivers from the first RF frequency to a third RF frequency if radar signals are detected on the second RF frequency during the predetermined period of time.

14. The WLAN modem of claim 8, wherein the controller is configured to initiate the scan for radar signals on the second RF frequency based on receiving a command requesting a WLAN channel change from the first RF frequency to the second RF frequency, and an indication that the second RF frequency is a dynamic frequency selection (DFS) frequency that is defined in a WLAN 802.11 standard.

15. The WLAN modem of claim 8, wherein the controller is configured to tune the first RF transceiver to operate at the second RF frequency by adjusting, the LO signal corresponding to the first RF transceiver to operate at the second RF frequency.

16. A wireless local area network (WLAN) subscriber device, comprising:

a memory that stores a user application associated with WLAN communication;

host application processor circuitry, coupled to the memory, configured to initiate a change channel command, the change channel command indicating a channel change for the WLAN communication from a first RF frequency to a second RF frequency;

a plurality of radio frequency (RF) transceivers, each configured to receive a WLAN signal operating at an RF frequency determined by a local oscillator (LO) frequency of a corresponding LO signal;

a plurality of WLAN baseband processor circuits, each coupled to a corresponding RF transceiver and configured to perform baseband processing associated with the WLAN signal; and a controller configured to:

determine whether the second RF frequency is a dynamic frequency selection (DFS) frequency; and if the second RF frequency is a DFS frequency, tune the RF frequency of a first RF transceiver of the plurality of RF transceivers from the first RF frequency to the second RF frequency to scan for radar signals operating on the second RF frequency, wherein a remainder of the plurality of RF transceivers are tuned to the first RF frequency to communicate WLAN data simultaneously with the scan for radar signals operating on the second RF frequency;

if the second RF frequency is not a DFS frequency, tune all of the plurality of RF transceivers to the second RF frequency without scanning for radar signals on the second RF frequency, wherein the corresponding LO signal for each transceiver in the remainder of the plurality of RF transceivers is tuned to the first RF frequency to communicate the WLAN data simultaneously with the scan for radar signals operating on the second RF frequency, and wherein the remainder of the plurality of RF transceivers and a corresponding number of LU signals are greater than or equal to two.

17. The WLAN subscriber device of claim 16, wherein the channel change command includes an indication of whether the second RF frequency is a DFS frequency.

18. The WLAN subscriber device of claim 17, wherein the host application processor circuitry initiates the channel change command based on a delay in response to queries initiated by the user application and sent via the WLAN communication.

19. The WLAN subscriber device of claim 16, further comprising:
radar detection processor circuitry configured to detect radar signals in baseband digital data output from the first RF transceiver of the plurality of RF transceivers.

20. The WLAN subscriber device of claim 19, wherein the radar detection processor circuitry is configured to analyze the baseband digital data to search for a periodic ON/OFF pulse characteristic that signifies the presence of radar signals on the second frequency.

* * * * *